Sept. 17, 1929.    C. R. FISHER    1,728,283
AUTOMATIC STOP FOR BELT CONVEYERS
Filed Feb. 14, 1927    2 Sheets-Sheet 1
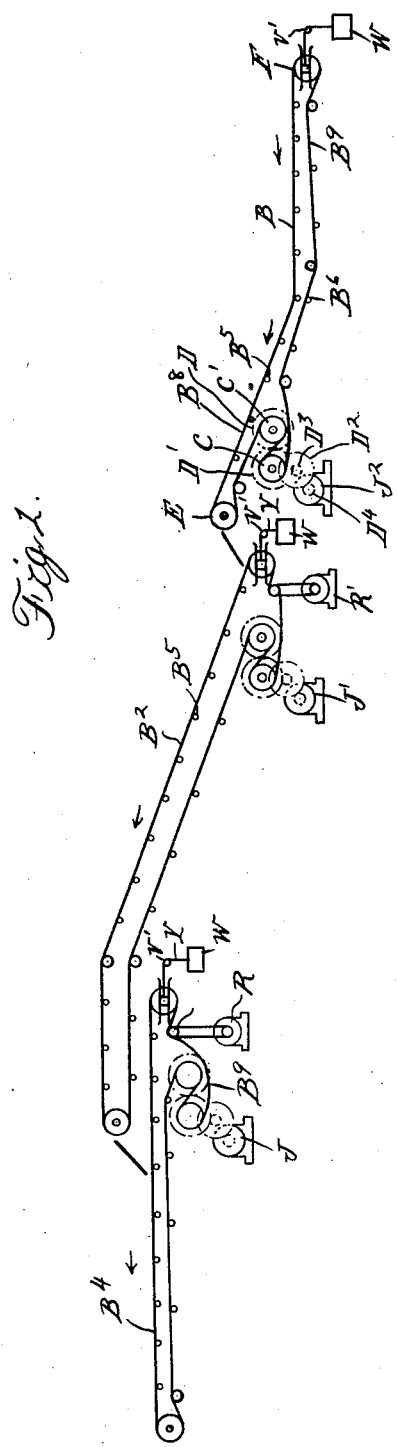
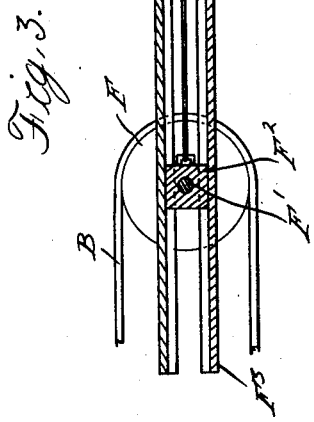
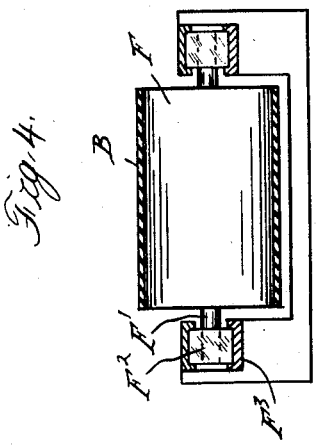
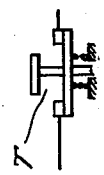
Inventor
Charles R. Fisher
By Whittemore Hulbert
Whittemore & Belknap
Attorneys

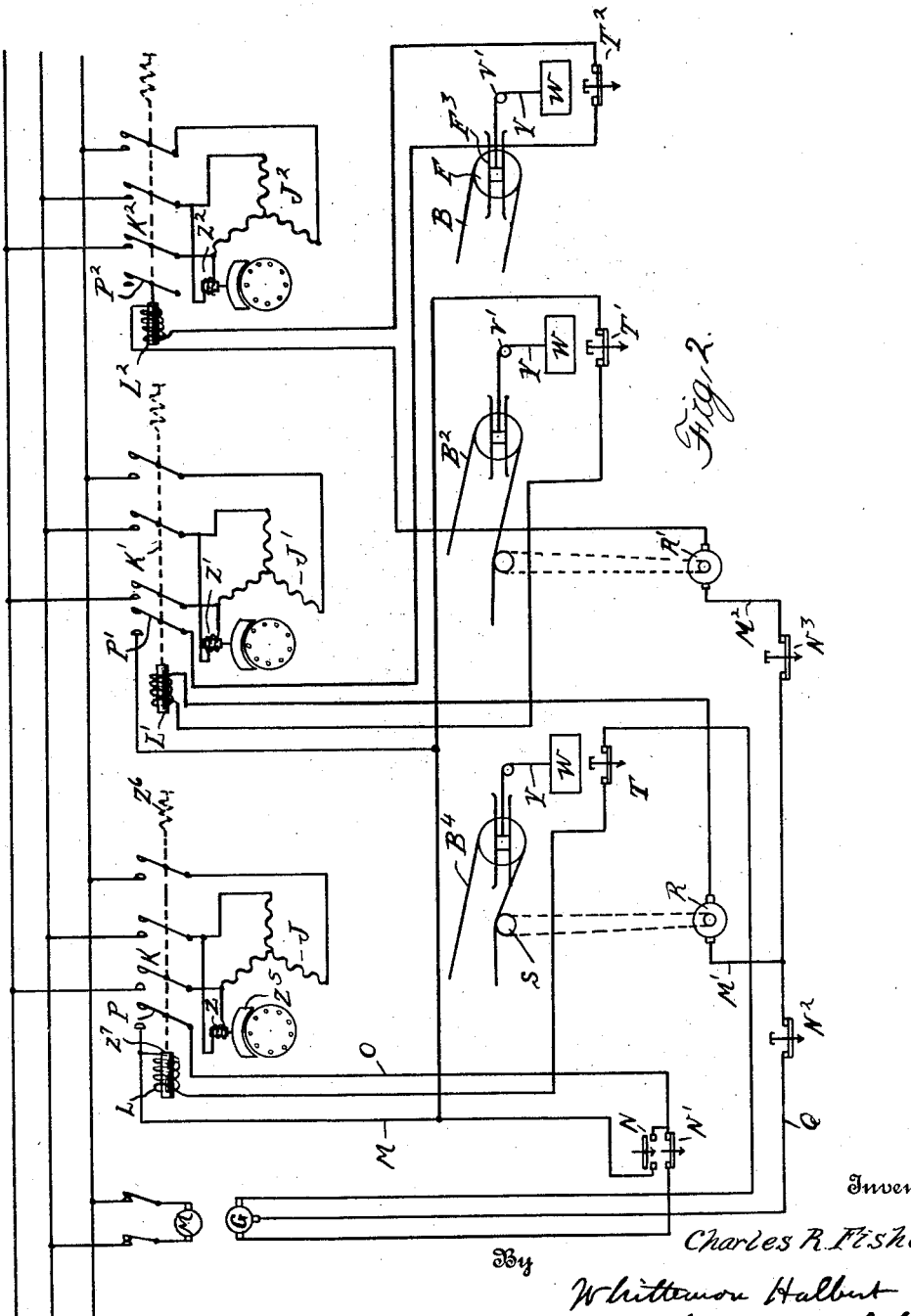

Patented Sept. 17, 1929

1,728,283

UNITED STATES PATENT OFFICE

CHARLES R. FISHER, OF ROGERS CITY, MICHIGAN

AUTOMATIC STOP FOR BELT CONVEYERS

Application filed February 14, 1927. Serial No. 168,152.

The invention relates to belt conveyer systems for loading and unloading bulk materials and this application is in part a continuation of Serial Number 368,999, filed March 26, 1920, now Patent Number 1,620,531, granted March 8, 1927.

In the co-pending application above referred to there is disclosed a system for controlling a series of conveyer belts, the arrangement being such that whenever one of the conveyer units is slowed down below a predetermined speed the mechanism automatically operates to stop all of the other conveyer units on the supply side thereof, but not on the delivery side. Thus the unit operating at reduced speed can continue to deliver the load to the succeeding conveyer belts and when the load is lightened, the unit will again resume its normal speed, thereby automatically setting the supplying conveyers in operation again. However, there are times when it may be desirable to automatically stop the motor of the unit when it is subjected to abnormal conditions, such for instance as when there is a breakage of the belt or when the overload on the belt is so great as to render the same liable to failure if the operation is continued. Therefore, an additional means is provided for stopping the motor of each conveyer unit under any of the above mentioned conditions, this means being preferably in the form of a circuit breaker in the motor circuit which is operated by abnormal movement of the belt take-up pulley due to the stretching or breaking of the conveyer belt.

The present application relates only to this automatic stop mechanism, the other features of the conveyer system forming the subject matter of the application above referred to and a second application filed on even date herewith.

In the drawings:

Figure 1 is a side elevation of a system of conveyer belts;

Figure 2 is an electrical diagram showing the automatic control of the various units of the system;

Figure 3 is an enlarged view of the tail pulley construction and the circuit breaker associated therewith;

Figure 4 is a section through the tail pulley.

The conveyer system comprises a series of endless belt conveyers B, $B^2$ and $B^4$, which are arranged so that the material conveyed by each conveyer is deposited upon the adjoining conveyer, thereby permitting the continuous advancement of a load in progressive stages. Each belt conveyer is preferably provided with its own driving means and as shown this means comprises the electric motors $J^2$, $J'$ and $J$ respectively. The motors may be connected to the conveyer belts in any of the well known ways, but as shown each motor operates two driving pulleys C and C' through the gearing D, D', $D^2$, $D^3$ and $D^4$. The conveyer belt is wrapped around the pulley C' and then extended over the pulley C so as to provide an extended area of frictional contact between the belt and the driving pulleys. Each conveyer is provided with two main pulleys, the forward pulley E and the tail pulley or take-up pulley F. The portion $B^8$ of the belt utilized for conveying the load extends between the pulleys F and E and is supported by suitable intermediate rollers which are preferably arranged in a curve transversely of the belt so as to impart a concave form to the load-carrying portion of the belt. These pulleys $B^5$ are arranged at spaced intervals throughout the length of the conveyer belt. The return or idling portion $B^9$ of the belt is supported on idling rollers $B^6$ which are preferably plain cylindrical rolls and are also spaced at intervals throughout the length of the belt.

With the type of conveyer unit as above described it will be seen that the driving of the belt is effected through the pulleys C and C', which cause the belt to travel in the direction of the arrows; that is, the load-carrying portion $B^8$ travels from the pulley F toward the pulley E. Thus when the belt is loaded with material, the portion of the belt under the greatest stress is adjacent the driving pulleys, while the stress in the belt diminishes from the pulley E toward the tail pulley F. The return portion $B^9$ of the belt is under practically no tension and the slack in the belt thus occurs between the driving pulley C and the tail pulley F. In order to take up the slack in the belt, the tail pulley F is mounted for sliding movement and as shown the shaft F' is journaled in slides F², which in turn are mounted in the bearings or ways F³. The tail pulley is resiliently urged in a direction to take up the slack of the belt by any suitable means, which as shown in the drawings comprises a weight W supported by a cord Y extending from the slides F² over a shive V'. It will of course be understood that other forms of take-up pulleys might be here employed if desired.

As has been stated above, the series of conveyer belts is arranged so that the material conveyed by one is deposited upon the adjacent conveyer, which in turn deposits it on the next succeeding conveyer, and so on. The successful operation of such a system is absolutely dependent upon control such that if a stoppage occurs at one point, the cooperating elements on the system may also be instantaneously stopped. For instance, if the conveyer B⁴ was stopped through any cause and the rest of the system maintained in movement, it would result in a continued deposit of material on the conveyer B⁴ from the conveyer B² and this would soon result in serious damage. Again, if any one of the conveyer units breaks down, it is imperative that all of the cooperating supply elements should be instantaneously stopped. Such a control has been obtained by rendering the motors or power-supplying means for each of the conveyer elements dependent in its operation on the movement of the conveyer element which is directly supplied by the first mentioned element. This system is described and claimed in the application Serial Number 368,999 above referred to, but is repeated in this application to show the association of the invention herein claimed with the construction of the prior application.

The conveyers B⁴, B² and B are respectively actuated by electric motors J, J' and J², which are so connected as to drive the belts at the proper speed. Each motor is provided with a controlling switch which is operated by an electromagnetic actuating mechanism in a control circuit and the arrangement is such that the switches are successively closed or opened, the motor from one conveyer being dependent for its operation upon the operativeness of the adjacent conveyer.

Various constructions of automatic controls may be used for this purpose, but as shown, the construction is as follows: K, K' and K² are the controlling switches, respectively, for the motors J, J' and J², and L, L' and L² are electromagnets for closing said switches. M is an electric control circuit, which includes the magnet L. N is a circuit closer or push button for the circuit M which is normally open, but which when closed will energize the magnet L and will close the switch K for the motor J. The push button N is used only to initially close the circuit and will automatically open when released, but there is provided a branch circuit O independent of the push button N, having a normally open circuit closer P, which is closed when the circuit M is once established. Thus the circuit will be maintained through the branch O after the button N is opened. N' is a push button or circuit breaker for opening the branch circuit O to cause the opening of the switch K and stopping of the motor J.

The motor J actuates the conveyer B⁴ and the actuation of the push button N first starts this delivery conveyer. The motors for the other conveyers are successively started by control circuits dependent upon the operation of the conveyer B⁴ and as shown the means employed is as follows: Q is an electric control circuit supplying current to the magnets L' and L², but insufficient to energize said magnets so as to close their respective switches K' and K². R is a booster generator which is included in a branch M' of the circuit Q, including the magnet L', said generator being driven by power derived from the conveyer B⁴. Thus, as shown, the generator R is driven from a friction wheel S in contact with the belt B⁴, so that it is necessary for the belt to acquire a predetermined velocity before the generator becomes operative. When, however, this velocity is attained, the current in the branch M' of the circuit Q will be sufficiently augmented to energize the magnet L' and to close the switch K'. This will start the motor J', which will drive the conveyer B². In the same manner a booster generator R' in the branch circuit M², including the magnet L² and which is driven from the conveyer B², will cause the closing of the switch K² as soon as the conveyer B² is in full operation. If there are more units in the system, they will be successively actuated by similar devices.

The magnet L' actuates a normally open circuit closer P' in the circuit M² and therefore the closing of the switch K² is dependent upon the switch K' and the opening of said switch K' by deenergizing the magnet L' will instantaneously break the circuit of the magnet L². In the same way the deenergizing of the magnet L by causing the opening of the circuit closer P will instantaneously open the circuit M' and deenergize the magnet L'. Thus the stopping of the motor J through the opening of its switch K also stops each of the motors J' and J². The motors J' and J² will also be stopped if the conveyer B⁴ slows down below a predetermined speed since the voltage of the generator R will be thereby reduced sufficiently to deenergize the magnet L' and consequently will release the switch K'.

From the construction just described it will be understood that when the push button N is operated, the delivery conveyer B⁴ is first set into the motion and when full velocity is attained, the conveyer B² is operated and after this also has acquired a predetermined velocity, the conveyer B is actuated. This will preclude the overloading of any of the conveyers as the conveyers on which the load is delivered are always in operation in advance of the delivering conveyers. It will also be understood that the stopping of the conveyer at the delivery end from any cause, such as breaking of the belt or slipping of the belt on the drive pulley, or the breaking of any part of the drive mechanism, will instantaneously stop the motors for the conveyers B² and B. It may, however, be desirable to stop the operation of the system, while the units thereof are all in operative condition. This can be accomplished either by operating the circuit opener N', which is adjacent to the delivery conveyer B⁴, or at other points in the system by circuit openers N², N³, etc., which are placed at various points in the control circuit Q. The circuit openers N² and N³, etc. will not stop the entire system, but each when operating will stop some particular unit together with all units at the supply end thereof.

The electric control as thus far described automatically stops only the preceding units of the system without controlling the motor of the abnormally operating conveyer or the succeeding conveyers. It is, however, desirable to automatically stop the motor of the conveyer which is operated abnormally, so that in case of breakage of one of the belts the driving motor therefor is automatically stopped. This is accomplished by placing in the circuit M an additional circuit breaker T, which will be operated by an overload on or clogging of the belt B⁴, or in case the belt breaks so that whenever the conveyer becomes inoperative its motor is instantaneously stopped. A similar circuit breaker T' is placed in the circuit M' to be actuated by an overload upon or breaking of the conveyer B² and a circuit breaker T² is correspondingly arranged in connection with the circuit M² and conveyer B.

The circuit breakers T, T' and T² are designed to be operated by a predetermined movement of the tail pulleys of the corresponding conveyer units. The circuit breakers are preferably in the form of normally spring-closed electric switches and are respectively arranged in the circuits containing the solenoids L, L' and L². Each switch is opened by contact of the cooperating weight W whenever the tail pulley is moved sufficiently to permit the engagement of the weight with the corresponding switch. Thus whenever the belt becomes sufficiently overloaded, the slack in the portion B⁹ of the belt increases and the take-up pulley is moved by the weight to compensate for the slack. A predetermined movement of the weight results in the opening of the circuit breaker and the consequent stopping of the driving motor of the conveyer. It should be noted that when the conveyer B² is stopped by reason of the opening of the circuit breaker T', the motor J' is automatically stopped and also the motor J² of the unit B supplying the conveyer B². However the motor J may continue in operation since it controls the conveyer on the delivery side of the conveyer B².

For stopping the motors when the electric circuits are deenergized, each is preferably provided with a brake Z⁵ which is so arranged as to be automatically applied. As shown, the brakes Z⁵ are gravity set and withdrawn electrically by the solenoids Z, Z' and Z². Each of these solenoids is electrically connected to the respective motor in such a manner as to be energized whenever the motor is energized, thereby withdrawing the brake. The switches K, K', K², etc. for controlling the driving motors may be of any suitable construction, but as indicated diagrammatically in Figure 2 they are normally held open by suitable springs Z⁶ and are closed by the movement of the cores Z⁷ by the respective solenoids L, L' and L².

What I claim as my invention is:

1. The combination of an endless belt conveyer, a take-up pulley slidably mounted at one end of the conveyer and having the belt return-wrapped therearound, a second pulley mounted at the opposite end of said conveyer, supporting members for the intermediate portions of the belt conveyer, driving means for said conveyer, means for moving said take-up pulley according to the stretching of the belt and means automatically operated by abnormal movement of the take-up pulley when the belt is overloaded for stopping said driving means.

2. The combination with a pair of main pulleys, one being slidably mounted, an endless conveyer belt wrapped around said pulleys forming an upper load-carrying portion and a lower return portion, driving means for the return portion of said belt, intermediate supporting rollers for the upper portion of said belt adapted to prevent the sagging of the same when loaded whereby the stretching of the belt due to the loading of the same forms slack in the return portion of the belt between said driving means and said slidably mounted pulley, means for urging said slidably mounted pulley in a direction to take up said slack and means automatically operated upon a predetermined movement of said pulley for stopping said driving means.

3. The combination with a pair of main pulleys, one being slidably mounted, an endless conveyer belt wrapped around said pulleys forming an upper load-carrying portion and a lower return portion, driving means for the return portion of said belt, intermediate supporting rollers for the upper portion of said belt adapted to prevent the sagging of the same when loaded whereby the stretching of the belt due to the loading of the same forms slack in the return portion of the belt between said driving means and said slidably mounted pulley, an electric control for said driving means and a circuit breaker for automatically operating said electric control to stop said driving means upon a predetermined movement of said slidably mounted pulley.

4. The combination of an endless belt conveyer, a take-up pulley slidably mounted at one end of the conveyer and having the belt return-wrapped therearound, a second pulley mounted at the opposite end of said conveyer, supporting members for the intermediate portions of the belt conveyer, driving means for said conveyer, means for moving said take-up pulley according to the stretching of the belt, means automatically operated by abnormal movement of the take-up pulley when the belt is overloaded for stopping said driving means, and means operable upon return of said take-up pulley to its normal position to permit an actuation of the said driving means.

In testimony whereof I affix my signature.

CHARLES R. FISHER.